(12) United States Patent
Petrovic

(10) Patent No.: US 6,168,005 B1
(45) Date of Patent: Jan. 2, 2001

(54) LOW PRESSURE DYNAMIC ACCUMULATION TABLE

(75) Inventor: Zmaj Petrovic, Westmount (CA)

(73) Assignee: Gebo Conveyors Consultants & Systems Inc., Quebec (CA)

( * ) Notice: Under 35 U.S.C. 154(b), the term of this patent shall be extended for 0 days.

(21) Appl. No.: 09/236,863

(22) Filed: Jan. 25, 1999

(51) Int. Cl.[7] .................................................. B65G 1/00
(52) U.S. Cl. ...................... 198/347.4; 198/447; 198/453
(58) Field of Search ................................ 198/347.4, 443, 198/445, 447, 453

(56) References Cited

U.S. PATENT DOCUMENTS

| 4,037,710 | 7/1977 | Brutcher . | |
|---|---|---|---|
| 4,054,199 | * 10/1977 | Polderman | 198/580 |
| 4,401,207 | 8/1983 | Garvey . | |
| 4,570,783 | 2/1986 | Newcom et al. . | |
| 4,635,784 | 1/1987 | Bourgeois . | |
| 4,714,152 | 12/1987 | Ross . | |
| 4,815,580 | 3/1989 | Schanz et al. . | |
| 4,852,714 | 8/1989 | Faber, Jr. . | |
| 4,917,228 | * 4/1990 | Ichihashi et al. | 198/347.4 |
| 4,944,635 | 7/1990 | Carlier et al. . | |
| 5,161,678 | * 11/1992 | Garvey | 198/347.4 |
| 5,282,525 | 2/1994 | Covert . | |
| 5,304,027 | 4/1994 | La Barre et al. . | |
| 5,400,894 | 3/1995 | Smith . | |

FOREIGN PATENT DOCUMENTS

| 25 04 264 | * 8/1976 | (DE) | 198/347.4 |

* cited by examiner

*Primary Examiner*—Jospeh E. Valenza
*Assistant Examiner*—Mark A. Deuble
(74) *Attorney, Agent, or Firm*—Merchant & Gould P.C.

(57) ABSTRACT

A low pressure accumulation table for accumulating products is described herein. The accumulation table includes an inlet, an outlet, at least one feed conveyor and at least two accumulation conveyors. The feed and accumulation conveyors define an accumulation surface. The feed conveyor and the two accumulation conveyors are so mounted side by side that the feed conveyor alternate with the two accumulation conveyors. The two accumulation conveyors, when energized, convey the products from the accumulation surface towards the outlet at a rate which is a function of the conveying speed of the two accumulation conveyors.

18 Claims, 5 Drawing Sheets

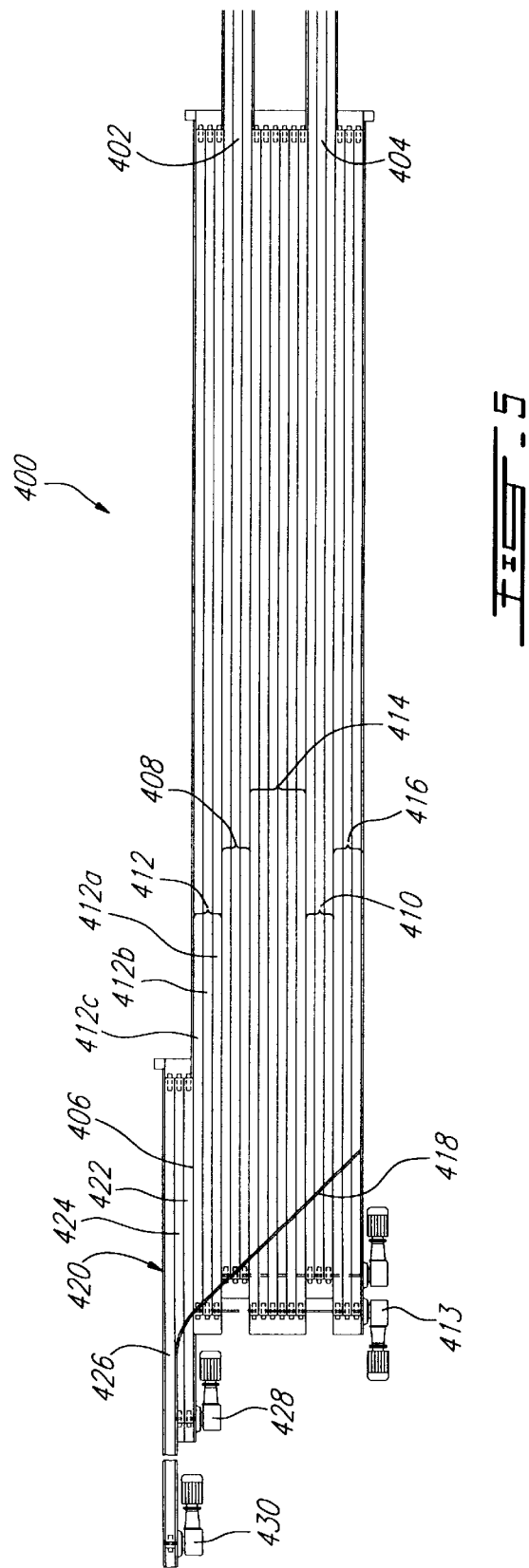

LOW PRESSURE DYNAMIC ACCUMULATION TABLE

FIELD OF THE INVENTION

The present invention relates to accumulation tables. More specifically, the present invention is concerned with a low pressure dynamic accumulation table.

BACKGROUND OF THE INVENTION

Accumulators and accumulation tables are well known in the art of conveyors. Indeed, in production lines where the unfinished products are moved on conveyors from one production machine to another, means for accumulating the products between consecutive machines must often be installed since the production machines usually go at different speeds or may have to be momentarily stopped for maintenance.

Various types of accumulators have been proposed in the past. These accumulators may usually be classified as first in, last out (FILO) accumulators, where the first items stored exist last or as first in, first out (FIFO) accumulators where the first items stored exit first.

FILO accumulators are usually not well suited to accumulate food products since they present the disadvantage that they have to be emptied periodically to prevent products from staying accumulated for too long. These accumulators are therefore less commercially interesting since their use is limited.

FIFO accumulators are more interesting since they do not share the above noted drawback of FILO accumulators.

U.S. Pat. No. 5,282,525, issued to William J. COVERT on Feb. $1^{th}$, 1994 and entitled: "Product Accumulator" describes an accumulator that may be viewed as a FIFO accumulator. A drawback of Covert's accumulator is that it must be kept reasonably short since it is not a low pressure accumulator. Indeed, since the conveyor belt always applies pressure onto the products accumulated, the number of products accumulated must be kept relatively low to prevent the accumulation pressure to reach a problematic level.

OBJECTS OF THE INVENTION

An object of the present invention is therefore to provide an improved accumulation table.

SUMMARY OF THE INVENTION

More specifically, in accordance with the present invention, there is provided a low pressure accumulation table for accumulating products; the accumulation table comprising:

- a frame having a first end, a second end and two opposite lateral sides;
- an inlet provided at the first end of the frame;
- an outlet provided at the second end of the frame;
- at least one feed conveyor so mounted to the frame as to convey products from the first end towards the second end of the frame; the at least one feed conveyor having a predetermined feed conveying speed;
- at least two accumulation conveyors mounted to the frame; the at least one feed conveyor and the at least two accumulation conveyors defining an accumulation surface; the at least two accumulation conveyors having a variable accumulation conveying speed that is slower than the predetermined feed conveying speed;
- wherein (a) the at least one feed conveyor and the at least two accumulation conveyors are so mounted side by side that the at least one feed conveyor alternate with the at least two accumulation conveyors; and (b) the at least two accumulation conveyors, when energized, convey the products from the accumulation surface towards the outlet at a rate which is a function of the variable accumulation conveying speed of the at least two accumulation conveyors.

It is to be understood that the term "conveyor" used in the present disclosure and in the appended claims should be construed as any type of conveying surface such as, for example, belt conveyors or adjacent chain conveyors running at the same speed.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 5 is a schematic top plan view of a low pressure dynamic accumulation table according to a fifth embodiment of the present invention.

DESCRIPTION OF THE PREFERRED EMBODIMENT

Figure 1:
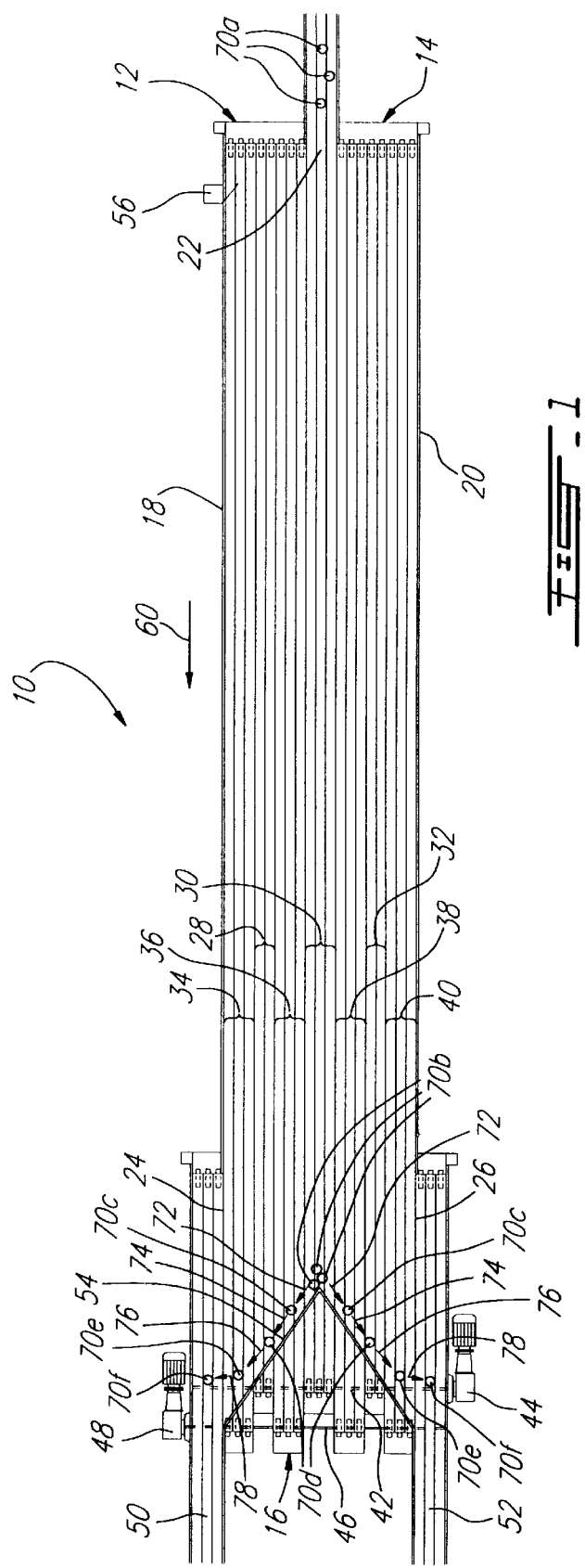
FIG. 1 is a schematic top plan view of a low pressure dynamic accumulation table according to a first embodiment of the present invention.

Turning now to FIG. 1 of the appended drawings, a low pressure dynamic accumulation table 10 according to a first embodiment of the present invention will be described.

The accumulation table 10 includes a frame 12 having a first end 14 and a second end 16, opposite lateral sides 18 and 20, an inlet 22, first and second outlets 24 and 26, three feed conveyors 28, 30 and 32 and four accumulation conveyors 34, 36, 38 and 40.

The frame 12 is provided to adequately interconnect the various elements of the accumulation table 10 together and will not be further discussed herein.

The opposite lateral sides 18 and 20 may be provided with longitudinal guides (not shown) to prevent products to fall.

The conveyors 28, 30, 32, 34, 36, 38 and 40 are illustrated as containing two or three individual chain conveyors. However, as will be fully understood upon reading of the following description, the individual chain conveyors could be replaced by other types of conveyors having similar conveying width.

The sum of the individual width of the feed conveyors 28, 30 and 32 defines a combined feed conveying width while the sum of the width of the accumulation conveyors 34, 36, 38 and 40 defines a combined accumulation conveying width. The feed and accumulation conveyors 28, 30, 32, 34, 36, 38 and 40 together define an accumulation surface of the accumulation table 10.

As can be seen from this figure, the feed conveyors 28, 30 and 32 and the accumulation conveyors 34, 36, 38 and 40 are so mounted to the frame as to be side by side while the feed conveyors and the accumulation conveyors alternate.

The feed conveyors 28, 30 and 32 are connected to a common shaft 42 powered by a motor 44. Similarly, the accumulation conveyors 34, 36, 38 and 40 are connected to a common shaft 46 powered by a motor 48.

The motors 44 and 48 are controlled by an electronic circuit (not shown) that may independently adjust the feed conveying speed and the accumulation conveying speed according to the state of the production line. Of course, the electronic circuit is provided with manual overrides allowing a human operator to take control of the various functions of the accumulation table 10.

As will be apparent from the following description, the accumulation conveying speed is advantageously slower than the feed conveying speed.

Two output conveyors 50 and 52 are provided to convey the products away from the outlets 24 and 26 of the accumulation table 10 as will be described in details hereinafter. Of course, the output conveyors 50 and 52 are independently controlled by motors (not shown).

The accumulation table 10 also includes a generally triangular guide 54 that guides products towards the outlets 24 and 26 as will be described hereinbelow.

The table 10 is also optionally provided with a sensor 56 provided near the first end 14 of the frame 12 to detect when the accumulation table 10 is full, indicating that the motor 44 powering the feed conveyors 28, 30 and 32 should be stopped. Of course, other sensors (not shown) could be provided to indicate the state of accumulation of the accumulation table 10.

The operation of the accumulation table 10 will now be described. It is to be noted that in the following description of the operation of the accumulation table 10, the number of product shown on the accumulation table is reduced for clarity purposes.

Generally stated, the top surfaces of the feed conveyors 28, 30 and 32 are always in movement in the direction of arrow 60 at a variable feed conveying speed. Products entering the accumulation table 10 via the inlet 22 are therefore conveyed from the first end 14 towards the second end 16 of the accumulation table 10.

When the accumulation table 10 is in an accumulation mode, the accumulation conveyors 34, 36, 38 and 40 are not moving. The products will therefore accumulate onto the accumulation table 10 since the energy imparted to the products is not sufficient to push them across accumulation conveyors 34 or 40 to reach respective outlets 24 or 26.

When the accumulation table 10 is in a normal mode, the top surfaces of the accumulation conveyors 34, 36, 38 and 40 move, at a conveying speed that is slower than the feed conveying speed, in the direction of arrow 60. The conveying speed of the accumulation conveyors determine the rate at which the products leave the accumulation table 10 via the outlets 24 and 26.

More specifically, products, such as, for example, cans 70*a*, placed onto the feed conveyor 30 enter the accumulation table 10 via the inlet 22. These cans will eventually reach the guide 54 (see cans 70*b*).

Under the combined action of the feed conveyor 30, of the guide 54 and of other surrounding cans pushing them, cans (see cans 70*c*) will be pushed onto the accumulation conveyors 36 and 38 (see arrows 72).

With the accumulation of cans onto the feed conveyor 30 and onto the accumulation conveyors 36 and 38, the cans present onto the accumulation conveyors 36 and 38 will be, under the combined action of other surrounding cans and of the guide 54, pushed onto the feed conveyors 28 and 32 (see cans 70*d* and arrows 74).

Again, under the combined action of the feed conveyors 28 and 32, of the guide 54 and of other surrounding cans, some cans will be pushed onto the peripheral accumulation conveyors 34 and 40 (see cans 70*e* and arrows 76).

Under the unique combined influence of the feed conveyors 28 and 32, the cans present on the peripheral accumulation conveyors 34 and 40 are not transferred to the output conveyors 50, 52 via the outlets 24, 26. Indeed, the energy transferred to these cans by the surrounding cans is generally not sufficient to make them cross the entire width of the accumulation conveyors 34 and 40. Therefore, if the accumulation table 10 is in the above-mentioned accumulation mode, only a very small number of cans will be transferred to the output conveyors 50, 52. Of course, to ensure that no can exits the accumulation table 10, wider accumulation conveyors 34 and 40 could be used.

If the accumulation table is in its normal mode, the output rate of cans transferred to the output conveyors 50 and 52 (see cans 70*f* and arrows 78) is determined by the accumulation conveying speed of the accumulation conveyors 34, 36, 38 and 40.

As will be easily understood by one skilled in the art of conveyors, the pressure applied to the accumulated products, i.e. the accumulation pressure, depends on many parameters. The accumulation table of the present invention provides means to decrease this accumulation pressure by increasing the ratio of accumulation conveying width to feed conveying width. Indeed, if the accumulation conveying width increases with respect to the feed conveying width the pressure exerted onto each accumulated product will decrease since there is proportionally less power pushing the products. Of course, the ratio of accumulation conveying width to feed conveying width may not be increased to infinity. Indeed, if the width of the accumulation conveyors is disproportionate with respect to the width of the feed conveyors, the products will not be supplied with enough power to cross the accumulation conveyors.

It is to be noted however, that if the ratio of accumulation conveying width to feed conveying width increases, it will also generally increase the time required for products to reach the outlets 24, 26 and therefore increase the accumulating effect of the accumulation table 10, even when the table 10 is in its normal mode, which may or may not be a beneficial effect depending on the application.

It has been found that a ratio of accumulation conveying width to feed conveying width of about two (2) is generally adequate to provide a sufficiently low accumulation pressure for most common products. Of course, this ratio is given as a non limiting example.

It is therefore believed that the alternation of the feed conveyors and of the accumulation conveyors is advantageous since it allows accumulation of products while managing the pressure exerted onto each product.

It is to be noted that while the operation of the accumulation table 10 has been given hereinabove with respect to products having a circular cross-section, such as, for example, cans, bottles or conveyor pucks, the accumulation table 10 could also be used to accumulate products having non-circular cross sections, as long as there are no acute angle in the product. Indeed, as will be readily understood by one skilled in the art, if the product has acute angles, it will be prevented from freely rotating under the action of the conveyors and/or of the adjacent products, leading to an increase of pressure onto the products.

Figure 2:
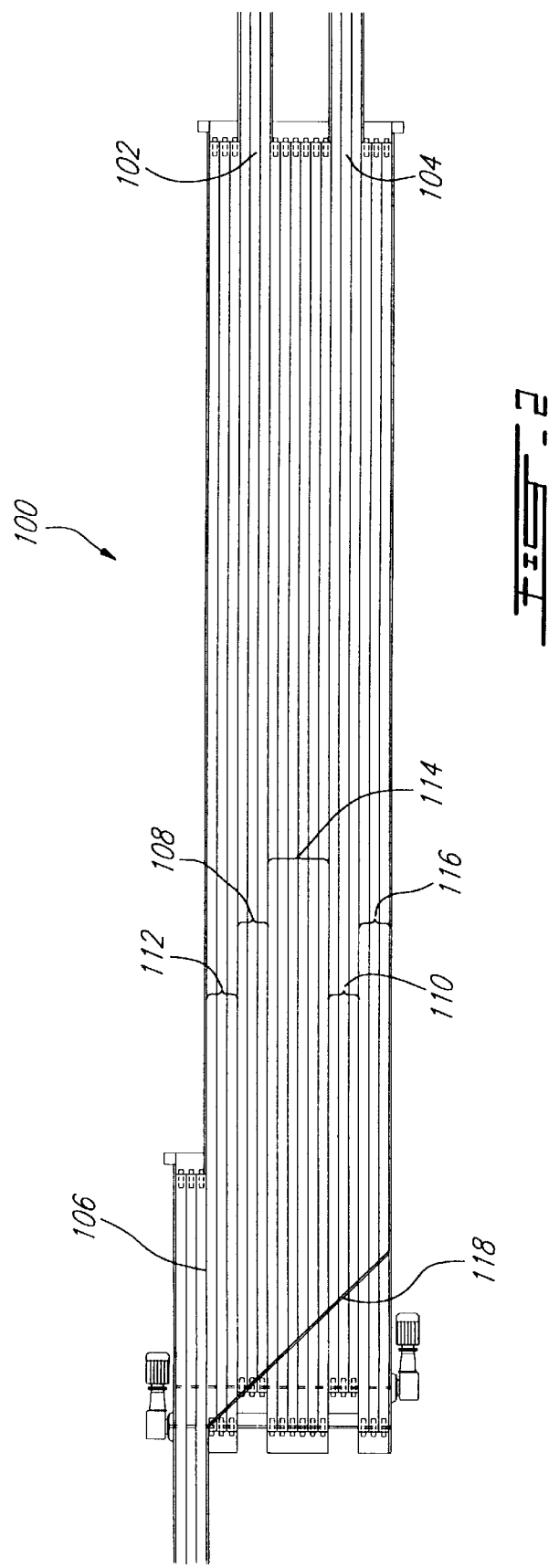
FIG. 2 is a schematic top plan view of a low pressure dynamic accumulation table according to a second embodiment of the present invention.

Turning now to FIG. 2 of the appended drawings, a low pressure accumulation table 100 according to a second embodiment of the present invention will be described.

It is to be noted that since the accumulation table 100 is very similar to the accumulation table 10 described hereinabove, only the differences between these two tables will be described hereinbelow, for concision purposes.

The accumulation table 100 includes two inlets 102 and 104 and one outlet 106.

The table 100 includes two feed conveyors 108 and 110 and three accumulation conveyors 112, 114 and 116. The purpose and the operation of the conveyors 108–116 are as described hereinabove with respect to table 10. It is to be noted however, that the central accumulation conveyor 114 is wider that the adjacent feed conveyors 108 and 110 since it receives products (not shown) from both feed conveyors.

An angled guide 118 is also provided to guide the products towards the outlet 106.

The accumulation table 100 may be advantageous in some cases since the products are brought to the accumulation table 100 from two individual machines.

Figure 3:
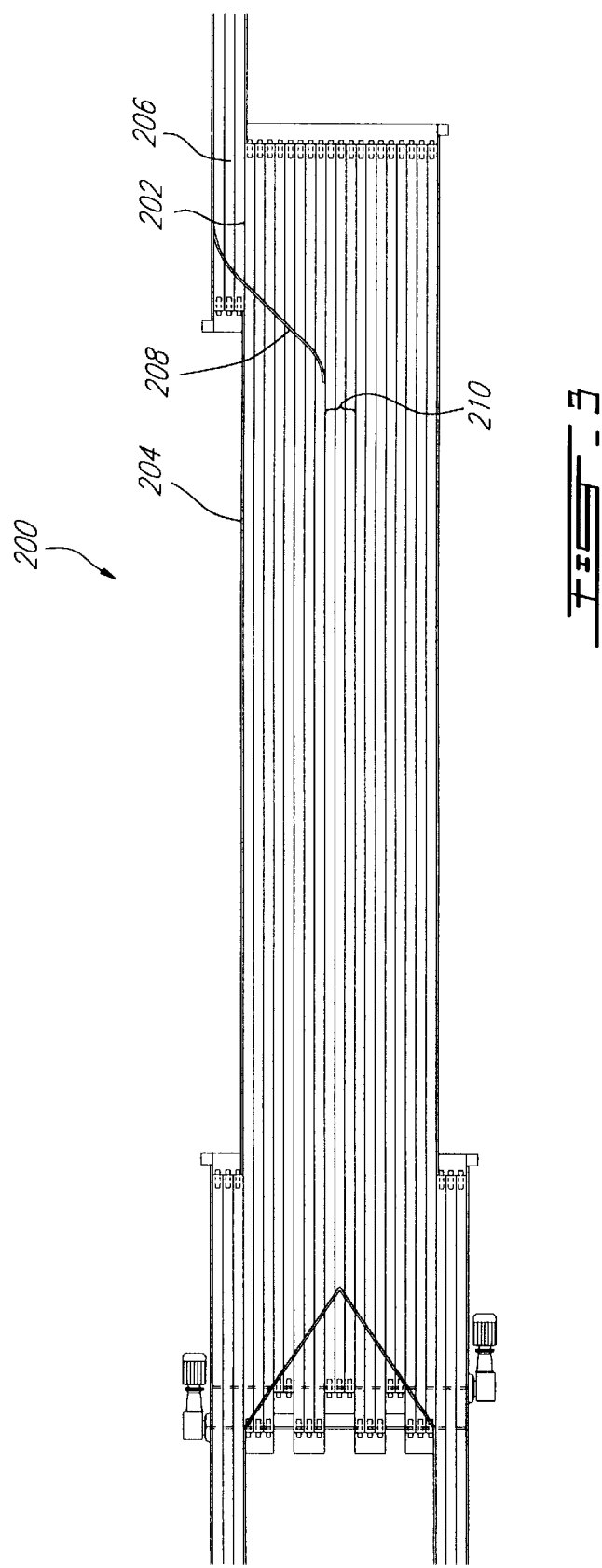
FIG. 3 is a schematic top plan view of a low pressure dynamic accumulation table according to a third embodiment of the present invention.

Turning now to FIG. 3 of the appended drawings, a low pressure accumulation table 200 according to a third embodiment of the present invention will be described.

Again, since the accumulation table 200 is very similar to the accumulation table 10 described hereinabove, only the differences between these two tables will be described hereinbelow, for concision purposes.

The major difference between the table 200 and the table 10 concerns the inlet 202 that is provided at a side 204 of the table 200.

The products (not shown) are therefore conveyed to the inlet 202 via an input conveyor 206. A generally S-shaped guide 208 is provided to guide the products from the input conveyor 206 to the central feed conveyor 210.

The accumulation table 200 may be advantageous in some cases since the products are brought to the accumulation table 200 by an input conveyor 206 that is not part of the table 200.

Figure 4:
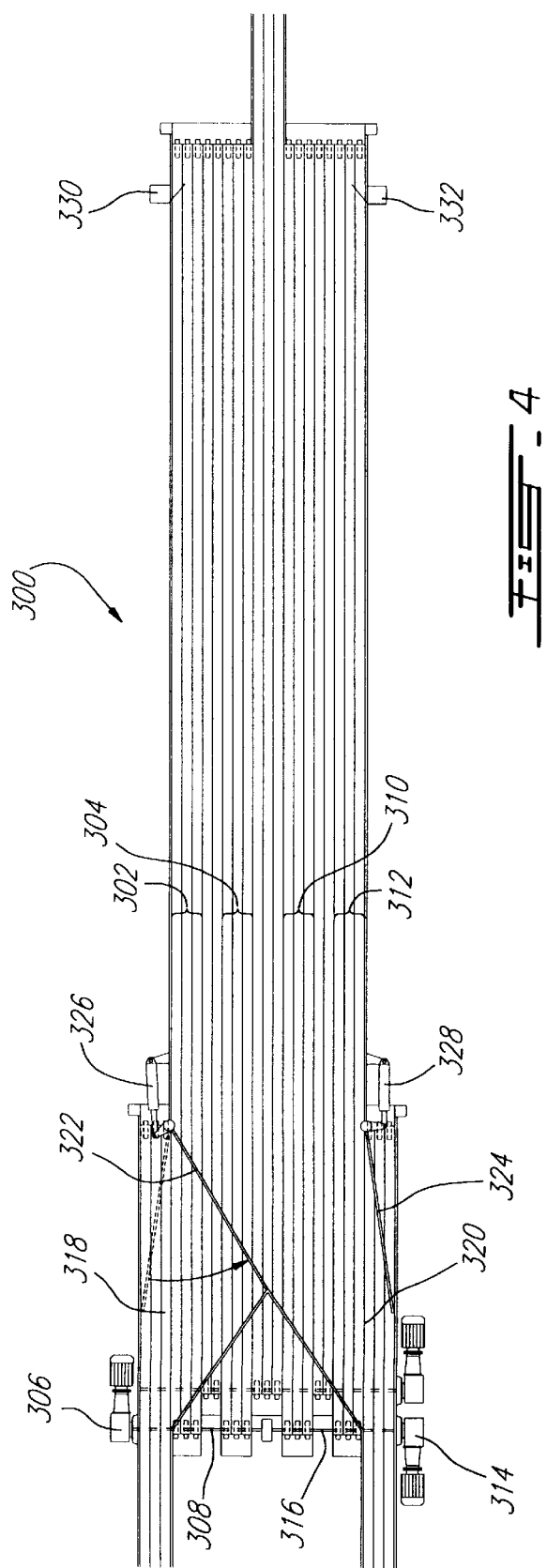
FIG. 4 is a schematic top plan view of a low pressure dynamic accumulation table according to a fourth embodiment of the present invention.

Turning now to FIG. 4 of the appended drawings, a low pressure accumulation table 300 according to a fourth embodiment of the present invention will be described.

Yet again, since the accumulation table 300 is very similar to the accumulation table 10 described hereinabove, only the differences between these two tables will be described hereinbelow, for concision purposes.

Two major differences exist between the table 300 and the table 10.

The accumulation conveyors 302 and 304 are powered by a motor 306 via a first shaft 308. Similarly, the accumulation conveyors 310 and 312 are powered by a motor 314 via a second shaft 316.

This independent control of the accumulation conveyors allows the output rate of products (not shown) to be different for outlet 318 and for outlet 320, which is an advantage if the outlets 318 and 320 are connected to different machines.

Secondly, the accumulation table 300 is provided with two movable guides 322, 324 that may be pivoted between a retracted position (see guide 324) where they do not interfere with the products (not shown) and a guiding position (see guide 322) where they guide products away from one outlet and towards the other outlet. Of course, the movable guides 322, 324 are powered by respective pneumatic cylinders 326, 328 or by other similar actuators.

This feature is interesting since it allows the accumulation table 300 to be used even though one of the outlets has a zero output rate, for example, if it is malfunctioning.

It is to be noted that the accumulation table 300 is provided with two sensor 330, 332 provided near the first end of the accumulation table 300 to detect when it is full, indicating that the motor powering the feed conveyors should be stopped. Indeed, since the accumulation of products onto the table 300 may take place on only one side, depending on the respective speeds of the motors 306 and 314, a sensor is advantageously provided on each side of the table 300.

Turning now to FIG. 5 of the appended drawings, a low pressure accumulation table 400 according to a fifth embodiment of the present invention will be described.

It is to be noted that since the accumulation table 400 is very similar to the accumulation table 10 described hereinabove, only the differences between these two tables will be described hereinbelow, for concision purposes.

The accumulation table 400 includes two inlets 402 and 404 and one outlet 406.

The table 400 includes two feed conveyors 408 and 410 and three accumulation conveyors 412, 414 and 416. The purpose and the operation of the conveyors 408–416 are as described hereinabove with respect to table 10. It is to be noted however, that the central accumulation conveyor 414 is wider than the adjacent feed conveyors 408 and 410 since it receives products (not shown) from both feed conveyors.

An angled guide 418 is also provided to guide the products towards the outlet 406.

A major difference between the table 400 and the other tables described hereinabove is that the accumulation conveyor 412 and the output conveyor 420 together define a pressureless single filer. Therefore, as will be understood by one skilled in the art, the accumulation conveyor 412 includes three chain conveyors 412a, 412b and 412c, each defining a conveying surface and driven at different speeds. More specifically, the speed of the conveyor 412c is greater than the speed of the conveyor 412b which is greater than the speed of the conveyor 412a.

Similarly, the output conveyor 420 includes three chain conveyors 422, 424 and 426, each defining a conveying surface and driven at different speeds. More specifically, the speed of the conveyor 426 is greater than the speed of the conveyor 424 which is greater than the speed of the conveyor 422 which is greater than the speed of the conveyor 412c of the accumulation conveyor 412.

The conveyors 412a, 412b, 412c, 422, 424 and 426 are therefore driven at different speeds that define a speed gradient increasing laterally and outwardly.

To obtain the speed differences described hereinabove, the conveyors 412a–412c are driven by a single motor 413 via different speed modifying elements (not shown), such as, for example, sprockets of different diameters. The conveyors 422 and 424 are driven by a single motor 428, also via speed modifying elements (not shown), while the conveyor 426 is driven by a single motor 430.

It is to be noted that the number of chain conveyors forming the output conveyor 420 is shown herein as a non limiting example. Furthermore, the chain conveyors could be replaced by other types of conveying surfaces.

The accumulation table 400 may be advantageous in some cases since the products are brought to the accumulation table 400 from two individual machines and must exit in a single file.

As will be easily understood by one skilled in the art, the various features of the accumulation tables 10, 100, 200, 300 and 400 described hereinabove have been given as illustrations only to show some of the possible configurations of accumulation tables according to the present invention. These features were therefore given as examples only and are not limiting in any way.

Although the present invention has been described hereinabove by way of preferred embodiments thereof, it can be modified, without departing from the spirit and nature of the subject invention as defined in the appended claims.

What is claimed is:

1. A low pressure accumulation table for accumulating products; said accumulation table comprising:
    a frame having a first end, a second end and two opposite lateral sides;
    an inlet provided at said first end of said frame;
    an outlet provided at said second end of said frame;
    at least one feed conveyor so mounted to said frame as to convey products from said first end towards said second end of said frame; said at least one feed conveyor having a predetermined feed conveying speed;
    at least two accumulation conveyors mounted to said frame; said at least one feed conveyor and said at least two accumulation conveyors defining an accumulation surface; said at least two accumulation conveyors having a variable accumulation conveying speed that is slower than said predetermined feed conveying speed;
    wherein (a) said at least one feed conveyor and said at least two accumulation conveyors are so mounted side by side that said at least one feed conveyor alternate with said at least two accumulation conveyors; and (b) said at least two accumulation conveyors, when energized, convey the products from said accumulation surface towards said outlet at a rate which is a function of the variable accumulation conveying speed of said at least two accumulation conveyors.

2. A low pressure accumulation table as recited in claim 1, wherein said inlet is provided at about the same distance between said two opposite lateral sides.

3. A low pressure accumulation table as recited in claim 1, wherein said inlet is provided near one of said two opposite lateral sides, said accumulation table further including an inlet guide configured and sized to laterally guide the products towards the center of the accumulation surface.

4. A low pressure accumulation table as recited in claim 3, further comprising an input conveyor conveying products towards said inlet.

5. A low pressure accumulation table as recited in claim 1, wherein said inlet includes first and second inlets.

6. A low pressure accumulation table as recited in claim 1, wherein said outlet is provided near one of said two opposite sides.

7. A low pressure accumulation table as recited in claim 6, further comprising an output conveyor conveying products away from said outlet.

8. A low pressure accumulation table as recited in claim 6, further comprising an angled guide so mounted to said second end of said frame as to guide products from said accumulation surface to said outlet.

9. A low pressure accumulation table as recited in claim 6, wherein one of said at least two accumulation conveyor is provided near said outlet; said one of said at least two accumulation conveyor including at least two conveying surfaces; said output conveyor including at least two conveying surfaces; said at least two conveying surfaces of said accumulation conveyor and said at least two conveying surfaces of said output conveyor being driven at different conveying speeds defining a speed gradient increasing laterally and outwardly.

10. A low pressure accumulation table as recited in claim 1, wherein said outlet includes first and second outlets.

11. A low pressure accumulation table as recited in claim 10, wherein said first outlet is provided near one of said two opposite lateral sides and wherein said second outlet is provided near the other of said two opposite lateral sides.

12. A low pressure accumulation table as recited in claim 11, further comprising a first output conveyor conveying products away from said first outlet and a second output conveyor conveying products away from said second outlet.

13. A low pressure accumulation table as recited in claim 11, further comprising a generally triangular guide so mounted to said second end of said frame as to guide products from said accumulation surface to said first and second outlets.

14. A low pressure accumulation table as recited in claim 11, further comprising a first movable guide that is pivotable from a non guiding position to a guiding position where it guides products away from said first outlet and towards said second outlet.

15. A low pressure accumulation table as recited in claim 14, further comprising a second movable guide that is pivotable from a non guiding position to a guiding position where it guides products away from said second outlet and towards said first outlet.

16. A low pressure accumulation table as recited in claim 11, wherein at least one of said at least two accumulation conveyors is powered by a first motor and wherein at least one of said at least two accumulation conveyors is powered by a second motor; said first and second motors being controlled independently.

17. A low pressure accumulation table as recited in claim 1, wherein (a) said at least one feed conveyor have a combined feed conveying width; (b) said at least two accumulation conveyors have a combined accumulation conveying width and (c) said accumulation conveying width is about twice the size of said feed conveying width.

18. A low pressure accumulation table as recited in claim 1, wherein (a) said at least one feed conveyor include at least two feed conveyors having a predetermined conveying width; (b) said at least two accumulation conveyors include at least three accumulation conveyor; (c) accumulating conveyors provided between two feed conveyors have a conveying width about twice the size of said predetermined conveying width of said at least two feed conveyors; and (d) accumulating conveyors not provided between two feed conveyors have a conveying width about the size of said predetermined conveying width of said at least two feed conveyors.

* * * * *